United States Patent [19]

Petersen, Jr.

[11] Patent Number: 4,658,645
[45] Date of Patent: Apr. 21, 1987

[54] WIND VELOCITY MEASURING APPARATUS

[75] Inventor: Wayne E. Petersen, Jr., Granville, Ohio

[73] Assignee: The Dow Chemical Company, Midland, Mich.

[21] Appl. No.: 827,709

[22] Filed: Feb. 10, 1986

[51] Int. Cl.⁴ .......................................... G01W 1/02
[52] U.S. Cl. ................... 73/189; 73/170 R; 116/215; 116/200; 116/264
[58] Field of Search ............... 73/170 R, 189, 861.74, 73/861.75, 861.76; 116/215, 200, 270, 273, 264, 265, 275, 211, 112; 349/601, 606, 610; 200/81.9 R; 206/459

[56] References Cited

U.S. PATENT DOCUMENTS

| | | | |
|---|---|---|---|
| 2,805,572 | 9/1957 | Carruthers | 73/189 |
| 2,935,872 | 5/1960 | Misner | 73/189 |
| 3,370,462 | 2/1968 | Bartlett et al. | 73/189 |
| 3,534,191 | 10/1970 | Siakel | 340/601 |
| 3,537,088 | 10/1970 | Wells | 340/601 |
| 3,564,917 | 2/1971 | Cronin et al. | 73/861.76 |
| 3,681,987 | 8/1972 | Ruskin | 73/861.76 |
| 3,926,144 | 12/1975 | Lander | 116/215 |
| 3,964,038 | 6/1976 | Rutherford | 73/189 |
| 4,034,174 | 7/1977 | McCord | 73/861.76 |
| 4,340,008 | 7/1982 | Mendelson | 116/215 |

Primary Examiner—Charles Frankfort
Assistant Examiner—Thomas B. Will
Attorney, Agent, or Firm—L. E. Hessenaur, Jr.

[57] ABSTRACT

A wind velocity measuring apparatus tips over when a predetermined wind velocity is reached or exceeded. The apparatus includes a base adapted to rest on a horizontal supporting surface such as a roof. An upright member extends upwardly from said base and carries at its upper end a wind impeding device in the form of a cylindrical vane or a plurality of radially extending, arcuately spaced vanes. A "telltale" device is sealed within the base to indicate when the apparatus has been tipped over by wind equalling or exceeding the predetermined velocity.

9 Claims, 5 Drawing Figures

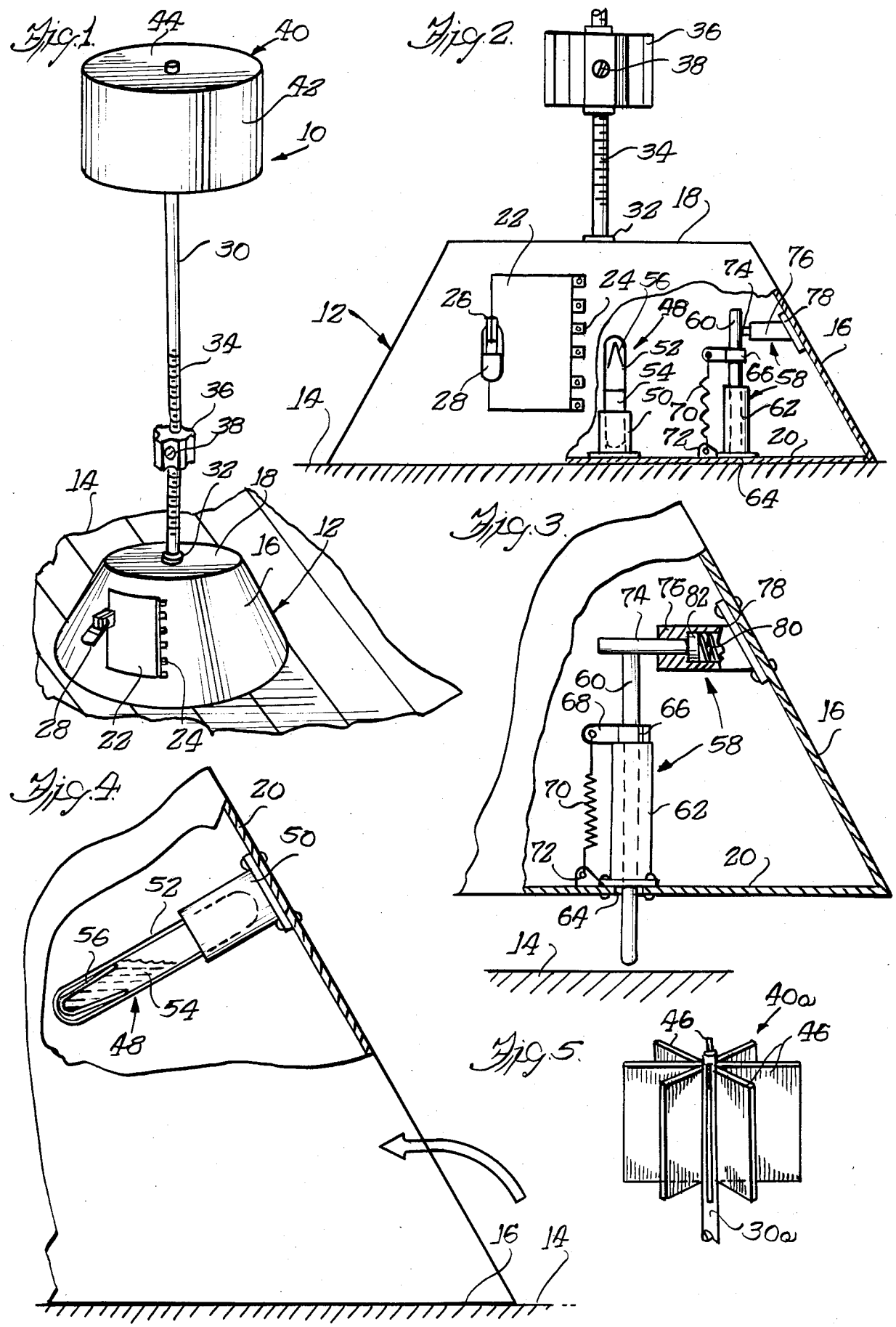

WIND VELOCITY MEASURING APPARATUS

BACKGROUND OF THE INVENTION

Roofs and various components thereof are subject to being damaged by strong winds, either of a sustained variety, or in gusts. It is common for a roofing installation to be guaranteed up to a certain wind velocity. When a roof is damaged by high wind and a question is raised as to the guarantee wind records from the nearest airport or other reporting station may be relied on. However, this is often highly inaccurate as winds often are extremely localized. There may be a strong wind at a given site that will damage a roof, while the nearest airport or other reporting station may be miles away and may record a very low wind speed, or even a dead calm. Furthermore, at many airports and other weather reporting stations it is common practice for the wind velocity be be read and reported manually at predetermined intervals. The time at which the wind speed may be recorded may differ quite substanially from the time of a roof damaging high wind.

Thus, a need exists for a device that can be placed on or in close proximity to a roof and which will indicate when a given wind speed has been reached or exceeded. There are weather reporting instruments including wind speed devices which will record the maximum wind speed attained, and even the time at which the maximum speed is attained. However, such devices or apparatuses are quite expensive, and therefore are not adapted to be placed on or proximate to a guaranteed roof.

OBJECTS AND SUMMARY OF THE PRESENT INVENTION

It is an object of the present invention to provide an inexpensive device for mounting on a roof or the like which will indicate when a predetermined wind speed has been reached or exceeded.

More particularly, it is an object of the present invention to provide an inexpensive device for placement on a roof which will provide a permanent record of wind speeds which reach or exceed a predetermined value, which device is essentially tamper-proof.

In attaining the foregoing and other objects and advantages of the present invention I provide a device which is adapted to be placed on or proximate to a roof which is guaranteed, which device is designed to tip over when a predetermined wind speed is reached or surpassed. To this end there is a base designed to rest on the roof or the like, and an upstanding shaft carrying a non-directional vane to catch the wind. A weight preferably is threaded on the shaft for up and down adjustment to vary the center of gravity, and hence the wind velocity at which the device will tip over. Locked within the base is a "telltale" device for indicating when the device has been tipped over. Typically, such telltale device will include an upright tube having a quantity of ink or the like in the bottom and an absorbent material at the top. If the device tips over the ink flows to the top portion of the tube and permanently marks the absorbent material. The base is locked against unauthorized intrusion so that only a designated person may inspect the telltale device. The permanent record of the telltale device prevents an owner from returning the device to upright position and claiming that the critical wind speed was not reached.

The wind measuring device also includes within the housing, and set from within the housing, a device protruding from the bottom thereof which will indicate if the device has been picked up and moved. This device also provides an indication if the wind indicating device has been tipped over.

THE DRAWINGS

The present invention will best be understood with reference to the following description when taken in connection with the accompanying drawings wherein:

FIG. 1 is a perspective view of a wind velocity measuring apparatus constructed in accordance with the present invention;

FIG. 2 is a fragmentary front elevational view on an enlarged scale of the apparatus with a portion of the base broken away to show internal parts;

FIG. 3 is a portion of FIG. 2 on a further enlarged scale showing certain parts in changed position;

FIG. 4 is a fragmentary view on a further enlarged scale of the base as tipped over and showing the action of the telltale; and FIG. 5 is a fragmentary perspective view of a modification of the invention showing a different type of vane.

DETAILED DESCRIPTION OF THE ILLUSTRATED EMBODIMENT

Turning now in greater particularity to the drawings there will be seen a wind velocity measuring apparatus 10 constructed in accordance with the present invention. The apparatus includes a base 12 which rests on a horizontal surface 14 such as a roof which has been guaranteed to withstand winds up to some predetermined wind velocity. The base is rotationally symmetric about its vertical axis and in the illustrative embodiment is shown as being frusto-conical, having a side wall 16, a flat top 18, and a flat bottom 20. The sidewall, the top, and the bottom can be made of any suitable material such as sheet metal or plastic, the parts being welded or soldered or otherwise secured if made of metal, and the parts being cemented or secured by solvent or sonic welding if made of plastic resin material. It is also contemplated that the top 18 and sidewall 16 would be integral.

The sidewall 16 is provided with a hatch or door 22 which is pivotally secured to the sidewall by means of a suitable hinge 24. Latch members 26 in the nature of hasps and a padlock 28 are provided for locking the door in closed position.

A vertical shaft or rod 30 extends upwardly from the base 12, being secured to the top 18 thereof by a suitable fitting 32. If desired the shaft may continue down to the bottom 20 and be secured thereto for greater strength and stability. At least a portion of the length of the rod is threaded at 34, and a knurled nut or weight member 36 is threaded thereon and is vertically adjustable in order adjustably to set the center of gravity of the apparatus 10. The nut or weight 36 should be adjustable in position only by authorized personnel and to this end a suitable means is provided for locking the member 36 to the threaded portion 34 of the shaft 30. This is illustrated by a key operated lock 38. It will be understood that beneath the lock portion illustrated there would be a set screw that can be tightened aggressively against the threads 34, or even a pin that would extend into a vertical slot or series of holes in the threaded portion of the rod 30.

At the top of the rod 30 there is mounted a wind resisting element 40 shown as a cylindrical vane 42 having a flat top 44 secured to the upper end of the rod or shaft 30.

A modified form of wind impeding device 40a is shown in FIG. 5 mounted at the top of shaft 30a. The wind impeding device in this instance comprises a plurality of radially extending vanes 46 which may be of any suitable material, such as metal or plastic resin material. The vanes are arranged symmetrically about the shaft 30a so as to impede or resist the wind equally from any direction, and thereby to tip over the apparatus 10 when a predetermined wind velocity is reached or exceeded.

Within the base 12 in a position where it can be reached by a hand extended through the opened door 22 there is provided a telltale device 48 comprising a socket 50 mounted on the upper surface of the base floor or bottom wall 20 by any suitable means. The interior of the socket is lined with a resilient material such as rubber, or is provided with resilient metal fingers, etc. in order to grip a glass tube or vial 52 having liquid ink or dye 54 in the bottom portion thereof, and absorbent material 56 near the upper end thereof, and which may be a folded strip of paper, a wad of cotton, etc The tube or vial will be openable, as will be understood, and the ink and absorbent material are placed in the tube or vial on the job site, with the tube or vial then being placed in the socket 50 where it is held resiliently so that it will not accidently move out of the socket, but can be moved out manually without difficulty.

If the wind reaches or exceeds a predetermined speed, either steady state or in gusts, the apparatus will tip over from the position of FIGS. 1 and 2 to approximately the position shown in FIG. 4. The tube or vial 52 is then at least partially inverted so that the ink or dye 54 therein runs into the upper end thereof to wet and permanently mark the absorbent material 56. Thus, if the roof owner should set the apparatus back upright and state that there had never been a substantial wind, it would be apparent from inspection of the telltale device 48 that the critical wind speed had been reached or exceeded Another "anti-cheat" device 58 is shown in FIGS. 2 and 3. A vertically disposed pin 60 is axially movable within a sleeve 62 riveted or otherwise suitably secured to the bottom wall or floor 20 of the base. The floor is apertured at 64 in alignment with the pin to permit the pin to extend downwardly therefrom. A collar 66 is fixed on the pin toward the upper end thereof and has a laterally extending arm 68. A tension spring 70 extends between the arm 68 and an anchor 72 on the floor 20 of the base. The spring 70 urges the pin down, but this is resisted by impingement of the lower end of the pin 60 against the roof 14 or the like. If the wind velocity measuring apparatus 10 should be lifted from the roof 14, then the pin springs down from the position of FIG. 2 to that of FIG. 3, downward movement being limited by collar 66 abutting the sleeve 62.

A lateral or horizontal pin 74 is mounted in a cylinder 76 secured by a base 78 thereon riveted or otherwise suitably secured to the sidewall 16 of the base. The cylinder 76 is provided internally with a compression spring 80 which bears against an enlarged head 82 on the inner end of the pin 74. The spring 80 tends to urge the pin 74 away from the sidewall 16, but this is limited by engagement of the end of the pin 74 with the side of the pin 60 when the pin is raised, as in FIG. 2. However, when the pin 60 moves downwardly as shown in FIG. 3, the pin 74 moves out of the cylinder 76 under urging of the spring 80 to lie above the upper end of the pin 60 as shown in FIG. 3. Thus, the pin 60 cannot be moved back up to the retracted position of FIG. 2 without opening the door 22 and reaching inside to reset the pins Thus, the installer of the roof can be certain that the roof owner has not moved the apparatus, such as by carrying it inside out of the wind, and then brought it back out after the roof has been damaged by the wind. The anti-cheat device 58 also provides a second telltale affirming by its position the staining of the absorbent material 56 by the ink or dye.

When installation and testing of a roof has been completed, the apparatus 10 is placed on the roof or on another horizonal surface very close thereto. The tube or vial is supplied with fresh ink or dye and with fresh absorbent material, and is placed in the socket 50. The pins 60 and 74 are manually reset, and the door 22 is closed and locked. The nut or weight member 36 may be screw threadedly adjusted up or down upon opening of the lock 38 to adjust the center of gravity of the apparatus 10. This adjustment may be made either before or after the apparatus is placed on the roof or the like 14.

If the roof should thereafter be damaged by wind, then the roofing installer or his guarantor, may inspect the wind velocity measuring apparatus 10 to see if it has been tipped over by the wind. If it has been tipped over, and remains tipped over, the installer knows that the wind velocity exceeded the guarantee limit, and that the installer therefore is not responsible for the wind damage to the roof. Tipping can be verified by inspection of the telltale device 48 to see if the ink or dye has stained the absorbent material 56, and also by noting the extended nature of the pin 60. The apparatus cannot be stood back up by anyone other than an authorized service man due to the extension of the pin 60. Such extension of the pin indicates either that the apparatus has been tipped over, or that it has been moved to some other location. Tipping further is verified by staining of the absorbent material by the ink or dye.

As will be apparent the apparatus is of simple construction and hence is inexpensive. Indeed, the cost is negligible as compared with the cost of a roofing installation, and it would do much to forestall future disputes as to responsibility for any wind damage done to the roof.

The specific examples of the invention as herein shown and described will be understood as being for illustrative purposes only. Various changes in structure will no doubt occur to those skilled in the art, and will be understood as forming a part of the present invention insofar as they fall within the spirit and scope of the appended claims.

The invention is claimed as follows:

1. Apparatus for indicating when a predetermined wind speed has been reached or exceeded comprising a base adapted to rest on a supporting surface, means upstanding from said base, wind impeding means on said upstanding means and effective to tip said apparatus over when said predetermined wind speed is reached or exceeded, and means sealed within said base to indicate when said apparatus has been tipped over.

2. Apparatus as set forth in claim 1 wherein the wind impeding means comprises vane means.

3. Apparatus as set forth in claim 2 wherein said vane means comprises a cylindrical vane.

4. Apparatus as set forth in claim 2 wherein said vane means comprises a plurality of radially extending and arcuately spaced vanes.

5. Apparatus as set forth in claim 1 and further including weight means vertically adjustable relative to said upstanding means to adjust the center of gravity of said apparatus and hence the wind speed at which it will tip over.

6. Apparatus as set forth in claim 5 and further including means for locking said weight means in vertically adjusted position.

7. Apparatus as set forth in claim 1 wherein said indicating means comprises container means within said base having a marking fluid in the lower portion thereof and means in said container means normally spaced above said marking fluid and marked thereby when said apparatus is tipped over.

8. Apparatus as set forth in claim 1 including a member normally urged downwardly by said base and projecting therefrom if said base is tipped or otherwise moved, and means for latching said member in projected position.

9. Apparatus as set forth in claim 7 including a member normally urged downwardly by said base and projecting therefrom if said base is tipped or otherwise moved, and means for latching said member in projected position.

* * * * *